Patented Jan. 23, 1923.

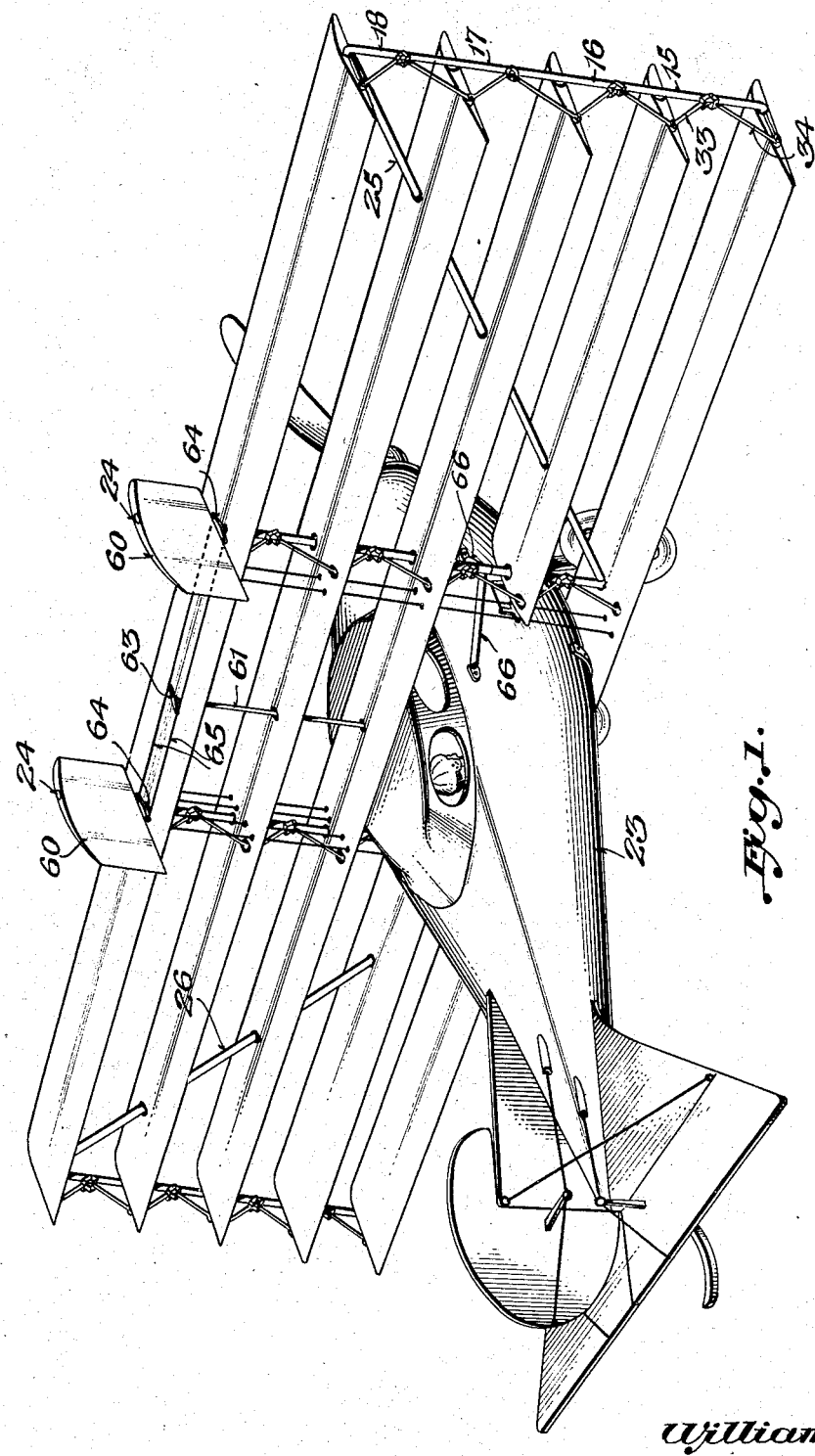

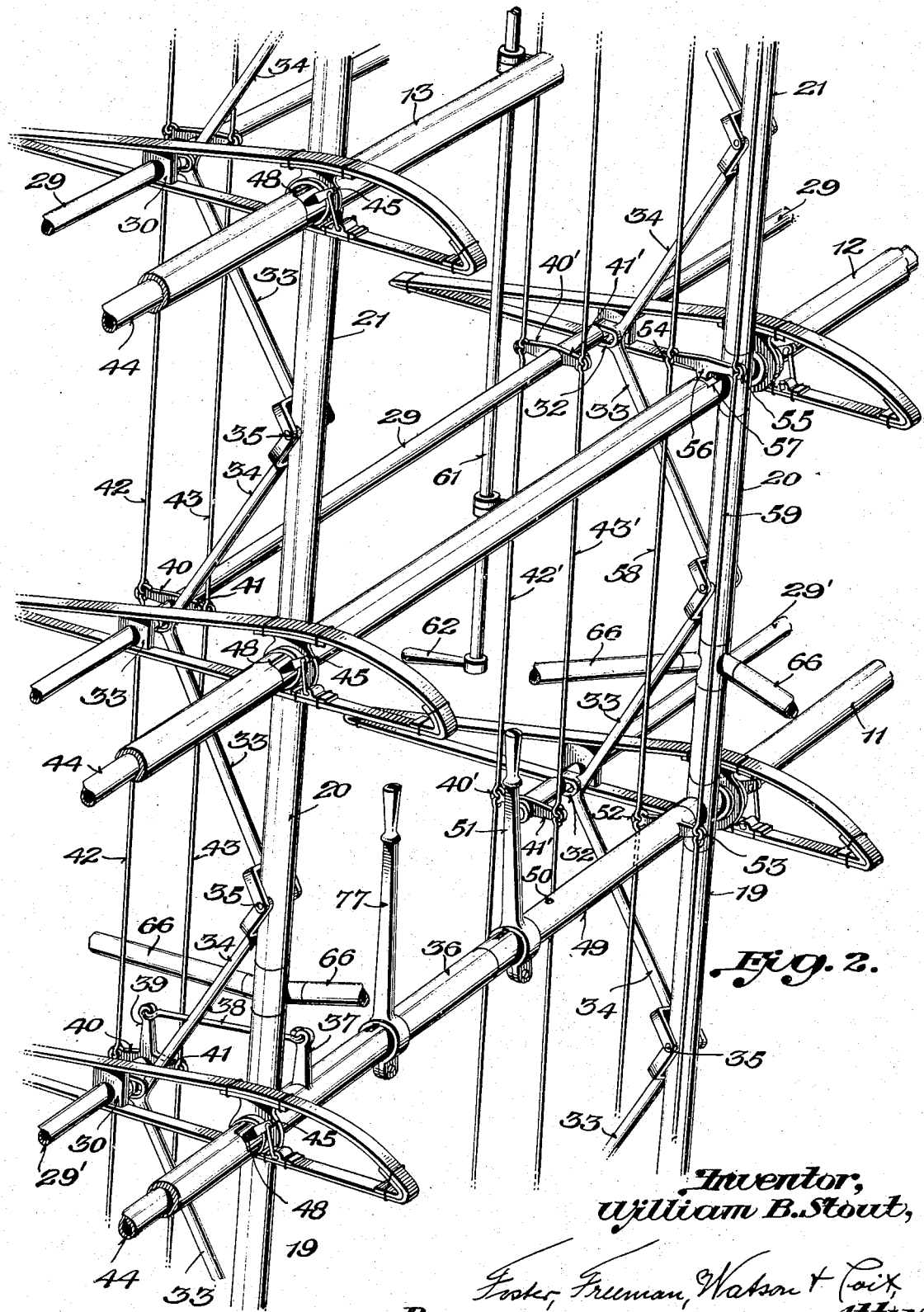

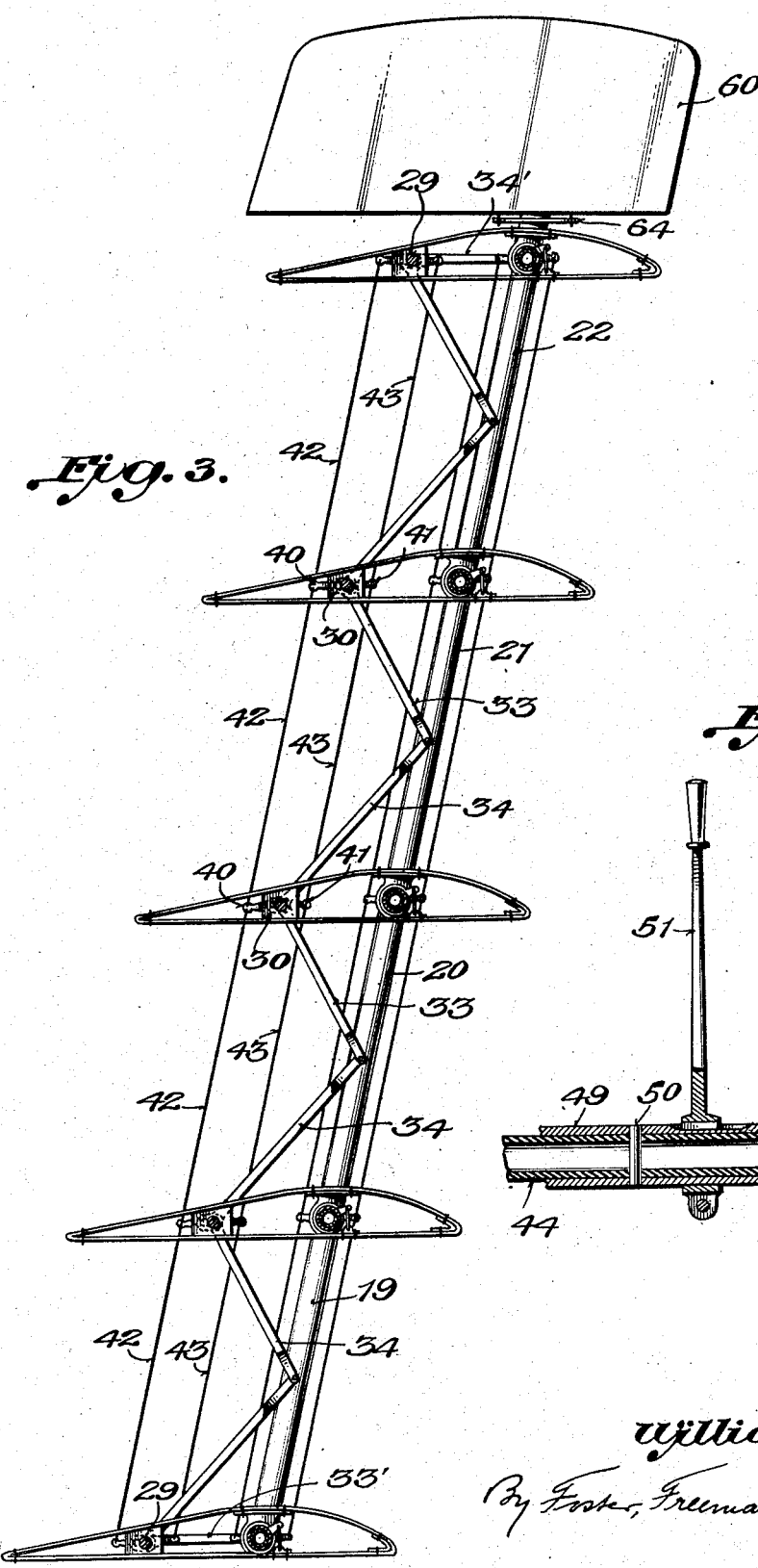
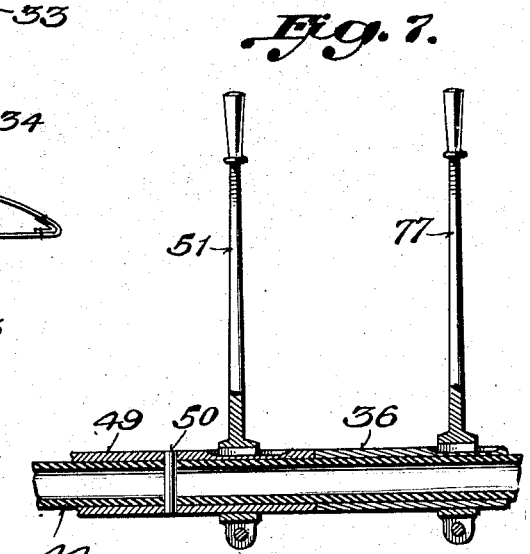

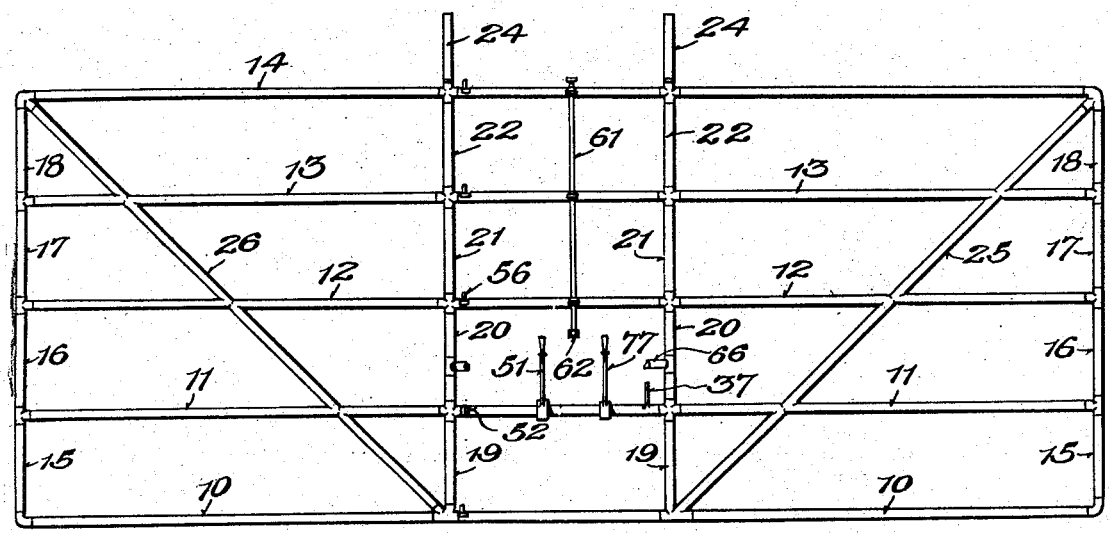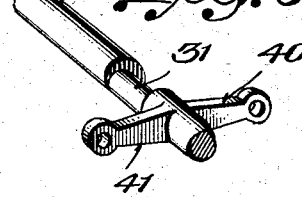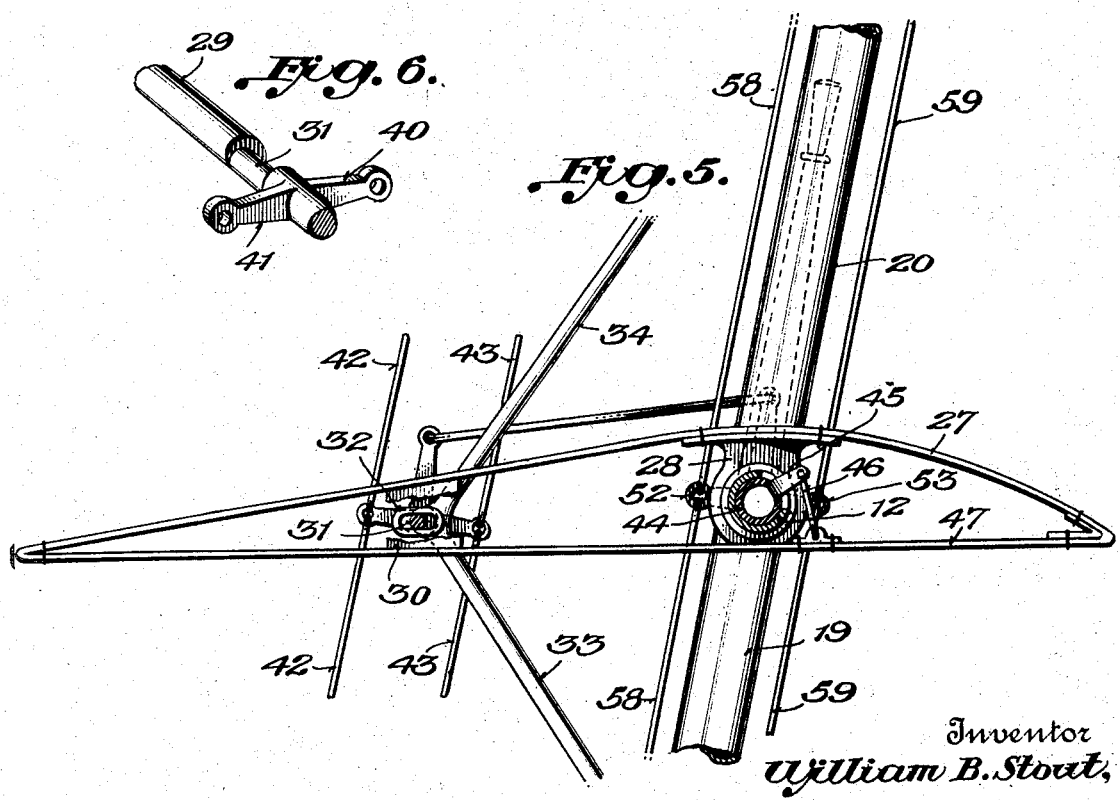

1,443,100

UNITED STATES PATENT OFFICE.

WILLIAM B. STOUT, OF DETROIT, MICHIGAN, ASSIGNOR TO PACKARD MOTOR CAR COMPANY, OF DETROIT, MICHIGAN, A CORPORATION OF MICHIGAN.

AIRPLANE.

Application filed April 8, 1919. Serial No. 288,557.

*To all whom it may concern:*

Be it known that I, WILLIAM B. STOUT, a citizen of the United States, and residing at Detroit, Wayne County, State of Michigan, have invented certain new and useful Improvements in Airplanes, of which the following is a specification.

The present invention relates to airplanes. The principal objects of the invention are to provide a rigid frame for airplanes which may be made complete as an article of manufacture independently of the other parts of the airplane; to provide means for varying the angle of incidence of the planes; to provide means for varying the camber of the planes; to provide an airplane having pivoted wings with means for stabilizing the flight thereof; and generally to provide a plane having the necessary adjustments so that it may be operated efficiently. Other objects and features of novelty will be apparent from the description taken in connection with the drawings in which:

Figure 1 is a perspective view of an airplane constructed in accordance with the present invention;

Figure 2 is an enlarged perspective view of a portion of the frame and associated ribs and showing the means for controlling the camber and the angle of incidence of the planes;

Figure 3 is a vertical sectional elevation through the plane;

Figure 4 is an elevation of the frame of the airplane;

Figure 5 is an enlarged sectional elevation through one of the planes showing the camber changing means and the means for varying the angle of incidence of the plane;

Figure 6 is a perspective view of a portion of a rear spar of one of the planes; and Figure 7 is a longitudinal sectional elevation through a portion of one of the front spars illustrating the mounting of the levers for controlling the camber changing means and the incident angle of the planes.

Referring to the drawings and more particularly to Figure 4, the frame of an airplane constructed in accordance with the present invention comprises a plurality of front spars 10, 11, 12, 13 and 14, the ends of which are rigidly connected by the vertical struts 15, 16, 17 and 18. It is to be understood that although a frame comprising five front spars is illustrated that the invention is not limited to any particular number of front spars or planes. Intermediate the outside struts mentioned above are other vertical struts. As shown, the front spars are rigidly connected by pairs of struts 19, 20, 21, and 22, disposed centrally of the length of the spars and preferably spaced a distance substantially the width of the fuselage 23 of the airplane. As will be described more in detail hereinafter, the airplane is equipped with vertical stabilizing planes at its top. To provide pivots for these stabilizing planes the central struts 22 are extended vertically above the top spar 14, thus providing the pivots 24. In order to increase the rigidity of the frame diagonal bracing members are provided. As shown, a diagonal bracing member 25 extends from a corner of the top of the strut 18 downward to the corner at the bottom of the central strut 19. A similar diagonal brace 26 is disposed at the other side of the plane symmetrically with respect to the brace 25. Preferably, all of the spars and struts mentioned are connected together so that they lie substantially in a single plane. Furthermore, the connections between the members forming the frame are such as to rigidly hold them together. To this end, if desired, the joints may be welded or devices such as pipe fittings may be employed.

It is desired to mount the planes of the frame so that they may be adjusted to vary their angles of incidence. To this end the planes are pivotally mounted on the frame and means is provided to adjust them about their pivots thereby varying the angle of incidence. As shown, the top members 27 of the ribs carry the bearing blocks 28 near their front ends through which extend the front spars. For the purpose of pivotally adjusting the ribs about their pivots means is provided to move the rear spars of the planes 29 up and down, thereby varying the angle of incidence of the planes. As shown, the rear spars 29 are pivotally mounted in bearing blocks 30 carried by the ribs of the planes and at the points opposite the vertical struts of the frame said rear spars are provided with eccentric portions 31. As clearly shown in Figures 2 and 5, these eccentric portions are disposed in the slotted bearings 32 carried by the brace rods 33 and 34 connected to the frame. As shown, these rods 33 and 34 have their ends bifurcated and mounted on pivots 35 carried by the struts substantially midway of their heights. As shown in Figure 3 the upper brace rod 34' supporting the upper rear spar 29 is arranged horizontally and likewise the lower brace rod 33' supporting the lowermost rear spar 29 is horizontal. In this manner a construction is provided whereby the frame, although it consists of members disposed in a single plane only, carries the rear spars. Means is also provided for rotating the rear spars, and because the bearing portions 31 thereof are eccentric to the axes of the spars said rear spars will effect a slight up and down movement of the ribs, thus varying the angle of incidence. The mechanism for turning the rear spars may consist of a sleeve 36 having a hand lever 77 within reach of the pilot of the machine. The sleeve 36 is provided with an arm 37 which by means of a link 38 is connected to a similar arm 39 secured to one of the rear spars 29. For the purpose of communicating the rotative movement of this last mentioned spar to the other spars, each of them is provided with a similarly located pair of oppositely extending arms 40 and 41. The adjacent arms 40 are connected by links 42 and the adjacent arms 41 by similar links 43. In the form of airplane illustrated the fuselage thereof is disposed between the bottom and the third from the bottom planes. Consequently the second from the bottom rear spar designated at 29' is cut away so as not to interfere with the fuselage. The sleeve 36 is associated with the corresponding front spar, the lever 77 thus being disposed conveniently to the pilot. It is necessary therefore to provide means for carrying the rotative movement of one portion of the rear spar 29' to the other portion thereof. This is accomplished by providing each of said rear spars with another pair of oppositely extending arms 40' and 41' disposed at the opposite side of the fuselage, the ends of these arms being connected by links 42' and 43'. Thus when the lever 77 is turned movement of the arm 37 will be communicated to one portion of the interrupted rear spar 29' and the rotation of this latter spar is communicated to each of the other rear spars. In turn, rotation of the other spars 29 is communicated to part of the spar 29' at the opposite side of the fuselage through the medium of the arms 40' and 41' and the links 42' and 43'.

In addition to the means for varying the angle of incidence of the planes, the aircraft is also provided with devices for varying the camber of the wings. To this end each of the front spars rotatively carries a shaft 44 and this shaft is provided with arms 45, one for each rib, the free end of each of these arms being connected by a link 46 to one of the members of the ribs. As shown, the link 46 is connected to the lower member of the rib. Thus as the shafts 44 are adjusted rotatively, the curvature of the surfaces of the planes will be varied. In the form of the plane illustrated the shafts 44 are tubular and are disposed rotatively within the front spars 10, 11, 12, 13, and 14, suitable apertures 48 being provided in the spars for the arms 45. Preferably, the spar 11 which otherwise would extend through the fuselage is cut away between the middle struts 19, but the shaft 44 is not thus interrupted. As shown in Figure 7 the sleeve 36 is mounted on the shaft 44. A similar sleeve 49 is arranged coaxially with the sleeve 36 and is carried by the shaft 44 for rotation therewith, a pin 50 being provided for this purpose. A hand lever 51 is secured to the sleeve 49 for rotation therewith. Movement of the lever 51 of course will be communicated to the shaft 44 carrying the sleeve 49, but it is necessary to provide means for turning the other shafts 44. To this end the sleeve 49 is provided with a pair of oppositely projecting horizontal arms 52 and 53 and the other shafts 44 have a similar pair of arms 54 and 55, said arms being connected to the shafts 44 by a stem portion 56 extending through an aperture 57 cut in each of the front spars. The arm 52 is connected to the arms 54 of the other shafts by links 58 and the opposite arm 53 of the sleeve 49 is connected to the corresponding arms 55 on the shafts 44 by links 59.

In order to eliminate the usual ailerons with the complicated mechanism that would be required to operate the same because of the fact that the planes are pivoted, the frame is provided with vertical stabilizer planes 60 pivotally mounted on the extensions 24 at the top of the airplane frame. Means is provided for controlling these stabilizer planes from the fuselage, and suitable mechanism is provided so that the pilot may turn these stabilizer planes on their pivots. As shown, a vertical rod 61 is pivotally carried on the front spars located above the fuselage and this rod at its lower end has a handle 62 disposed within the fuselage. At its upper end the rod 61 is provided with a cross arm 63, the ends of which are connected to similar cross arms 64 on the planes 60 by means of the links or cables 65.

If desired, the connection between the frame and the fuselage may be strengthened by means of tie rods 66 which are rigidly connected at their ends to the pair of vertical struts 20.

The ribs and means for changing the camber thereof as shown and described in this application are claimed specifically in the copending application 220,070 filed March 2, 1918.

It is to be understood that the invention is not limited to the exact details and arrangements illustrated, but includes modifications and changes which come within the scope of the appended claims.

Having thus described the invention what is claimed as new and desired to be secured by Letters Patent is:

1. As an article of manufacture an airplane frame comprising parallel spaced spars, a strut extending across the spars at their ends, a pair of spaced struts extending across the spars at their middle parts, a rigid reinforcing member extending diagonally from a corner of the frame to the opposite end of the adjacent middle strut, and a similar diagonal reinforcing member symmetrically disposed relative to the first reinforcing member, said spars, struts and members being rigidly fastened together.

2. As an article of manufacture an airplane frame comprising parallel spaced spars, a strut extending across the spars at their ends, a pair of spaced struts extending across the spars at their middle parts, a rigid reinforcing member extending diagonally from an outside strut to the adjacent middle strut, and a similar member symmetrically disposed relative to the first member, said spars, struts and members being rigidly fastened together.

3. An airplane frame including tubular spars connected by struts, and a shaft rotatably mounted in each of the spars; said struts and spars being rigidly fastened together.

4. An airplane frame including spars connected by struts, one of said spars being tubular and having a shaft rotatably mounted therein; said struts and spars being rigidly fastened together.

5. An airplane frame including tubular spars, struts and diagonal reinforcing members rigidly fastened together, one of said spars having a shaft rotatably mounted therein.

6. An airplane including a rigid frame comprising spars and struts, a plane mounted on each spar for pivotal movement about the same, and means carried by said struts to adjust the planes about the spars to vary the angle of incidence.

7. An airplane including in combination, a rigid frame having struts, a plane mounted to be adjusted about an axis perpendicular to the direction of flight and adjacent its surface to vary the angle of incidence, and means directly carried by said struts operative on the plane in rear of said axis to adjust the same about said axis.

8. An airplane including in combination, a frame having a front spar, ribs pivotally mounted on said front spar, a rear spar extending through said ribs and carried by the frame, and means to raise and lower the rear spar to effect an angular adjustment of the ribs about their pivots.

9. An airplane comprising in combination, a frame consisting of spars and struts rigidly connected together, planes pivotally mounted on said spars, rear spars associated with the planes, means supporting said rear spars on the frame, and means cooperating with said supporting means to effect an angular adjustment of said planes about their pivots to vary the angle of incidence.

10. An airplane comprising in combination, a frame consisting of spars and struts arranged in a single plane, planes pivotally mounted on said frame, and means supported by said struts operative to adjust the planes about their pivots.

11. An airplane comprising in combination, a frame consisting of struts and vertically spaced spars, a second spar for each of the first spars supported on the frame parallel to and substantially in the same horizontal plane as the first spars, ribs carried by the pair of spars in the same horizontal plane being pivotally mounted on one of them and means to angularly adjust the ribs about their pivots.

12. An airplane comprising in combination, a frame consisting of struts and vertically spaced spars, a second spar for each of the first spars supported on the frame parallel to and substantially in the same horizontal plane as the first spars, ribs carried by the pair of spars in the same horizontal plane being pivotally mounted on one of them, and means including the other spar to angularly adjust the ribs about their pivots.

13. An airplane comprising in combination, a frame including front spars, ribs rotatively mounted on said spars, rear spars for the ribs rotatively associated therewith, bearings supporting the rear spars on the frame, the axes of said bearings being eccentric to the axes of the rear spars, and means to turn the rear spars, thereby effecting rotative adjustment of the ribs about the front spars.

14. An airplane comprising in combination, a frame including front spars, rear spars carried by the frame, ribs supported by said spars and pivotally mounted for angular adjustment about one, and means to so adjust the ribs to vary the angle of incidence of the planes.

15. An airplane including an integral frame comprising spars and struts, and a plane associated with each spar for pivotal movement about the same to vary the angle of incidence and means mounted on said struts at the rear side of said frame to adjust said planes on their pivots.

16. An airplane comprising in combination, a frame including struts, planes mounted on said frame for turning to adjust the angle of incidence, each plane having a spar adjacent its trailing edge, and means supporting said spars on said struts for slight vertical adjustment whereby the angle of incidence of the planes may be varied.

17. An airplane comprising in combination, a frame, ribs rotatively mounted on said frame, rear spars, bearings for the ribs on the spars, bearings supporting said spars on the frame, the axis of one set of said bearings being eccentric to the axis of the other set and means to turn said spars thereby effecting rotative adjustment of the ribs and varying the angle of incidence.

18. An airplane comprising in combination, an integral frame consisting of spars and struts arranged in a single plane, shafts rotatively disposed in the spars, means to effect simultaneous rotation of said shafts, and means actuated by the shafts to adjust the camber of the wings.

19. An airplane comprising in combination, an integral frame consisting of spars and struts arranged in a single plane, a shaft rotatively carried by each of the spars, means to effect simultaneous rotation of said shafts, and means actuated by the shafts to adjust the camber of the wings.

20. An airplane comprising in combination, an integral frame consisting of spars and struts, and means carried by the spars to adjust the camber of the planes.

21. An airplane comprising in combination, an integral frame consisting of spars and struts, and means disposed within the spars operative on the plane ribs to adjust the camber of the planes.

22. An airplane comprising in combination, a frame including spars and struts, supporting rods disposed in V arrangement carried by said struts, other spars supported at the apexes of said rods for vertical adjustment, ribs carried by said spars, and means for adjusting said last mentioned spars vertically.

23. An airplane comprising in combination, a frame including spars and struts disposed in a single plane, supporting rods projecting rearwardly from said struts disposed in V arrangement, rear spars carried at the apexes of said rods for vertical adjustment, ribs mounted on said spars, and means to adjust said rear spars vertically to vary the angle of incidence of the planes.

24. An airplane comprising in combination, a vertically disposed frame, ribs rotatively mounted on said frame, rear spars associated with the ribs, supporting rods for said spars disposed in V arrangement and carried by said frame, and means to adjust said rear spars vertically to adjust the angle of incidence of the ribs.

25. An airplane comprising in combination, a frame consisting of spars and struts, means carried by the spars to adjust the camber of the planes, and means carried by the struts to vary the angle of incidence of the planes.

26. An airplane comprising in combination, a frame consisting of spars and struts, ribs mounted on said spars, means disposed within the spars operative on the ribs of the planes to adjust the camber of the wings, and means carried by the frame to vary the angle of incidence of the planes.

27. An airplane comprising in combination, a frame consisting of spars and struts, ribs mounted on said spars, means carried by the spars within said ribs operative on the ribs to adjust the camber of the wings, and means carried by the frame to vary the angle of incidence of the wings.

28. An airplane comprising in combination, a frame consisting of spars and struts, ribs mounted on said spars, means carried by the spars within said ribs operative on the ribs to adjust the camber of the wings, rear spars for the ribs, means adjustably supporting said rear spars on the frame, and means to adjust the rear spars to vary the angle of incidence of the planes.

29. An airplane comprising in combination, a frame consisting of spars and struts, ribs carried by said spars, means carried by the spars and disposed within the ribs operative on said ribs to vary the camber thereof.

In testimony whereof I affix my signature.

WILLIAM B. STOUT.